United States Patent [19]
Petras

[11] Patent Number: 5,903,999
[45] Date of Patent: May 18, 1999

[54] ELECTROLYSIS FISHING LURE

[76] Inventor: Terry G. Petras, Box 808, Chemainus, British Columbia, Canada, V0R 1K0

[21] Appl. No.: 09/019,281

[22] Filed: Feb. 5, 1998

[51] Int. Cl.[6] .................................................. A01K 75/02
[52] U.S. Cl. ............................................ 43/17.6; 43/17.5
[58] Field of Search ................................... 43/17.5, 17.6; 429/7, 8, 96, 98, 118, 119, 128, 130, 140, 146

[56] References Cited

U.S. PATENT DOCUMENTS

| | | | |
|---|---|---|---|
| D. 347,459 | 5/1994 | Gowing et al. | D22/126 |
| 2,303,097 | 11/1942 | Townsend et al. | 43/17.1 |
| 3,708,903 | 1/1973 | Bercz et al. | 43/17.6 |
| 3,895,455 | 7/1975 | Johnston | 43/17.6 |
| 3,936,970 | 2/1976 | Hodges | 43/17.6 |
| 4,114,305 | 9/1978 | Wohlert et al. | 43/17.6 |
| 4,175,348 | 11/1979 | Ray | 43/17.6 |
| 4,638,584 | 1/1987 | Lindsay | 43/17.6 |
| 4,741,120 | 5/1988 | Cota et al. | 43/17.6 |
| 4,823,497 | 4/1989 | Pierce | 43/17.6 |
| 4,959,919 | 10/1990 | Rao et al. | 43/17.6 |
| 5,159,773 | 11/1992 | Gentry et al. | 43/17.1 |
| 5,299,107 | 3/1994 | Ratcliffe et al. | 362/158 |
| 5,406,738 | 4/1995 | Holleman, Sr. | 43/42.15 |

FOREIGN PATENT DOCUMENTS

| | | | |
|---|---|---|---|
| 331518 | 9/1989 | European Pat. Off. | 43/17.6 |
| 633050 | 1/1928 | France | 43/17.6 |
| 526228 | 5/1931 | Germany | 43/17.6 |
| 2757997 | 6/1979 | Germany | 43/17.6 |
| 3718968 | 12/1988 | Germany | 43/17.6 |
| 21785 | 3/1911 | Norway | 43/17.6 |
| 144124 | 6/1920 | United Kingdom | 43/17.6 |
| 449736 | 7/1936 | United Kingdom | 43/17.6 |

*Primary Examiner*—Michael J. Carone
*Assistant Examiner*—Fredrick T. French, III

[57] ABSTRACT

An electric fishing lure is provided including a first body having at least one portion thereof formed of a first metal. Associated therewith is a second body having at least one portion thereof formed of a second metal. The second body is movable with respect to the first body for allowing an alternating current to be generated.

11 Claims, 2 Drawing Sheets

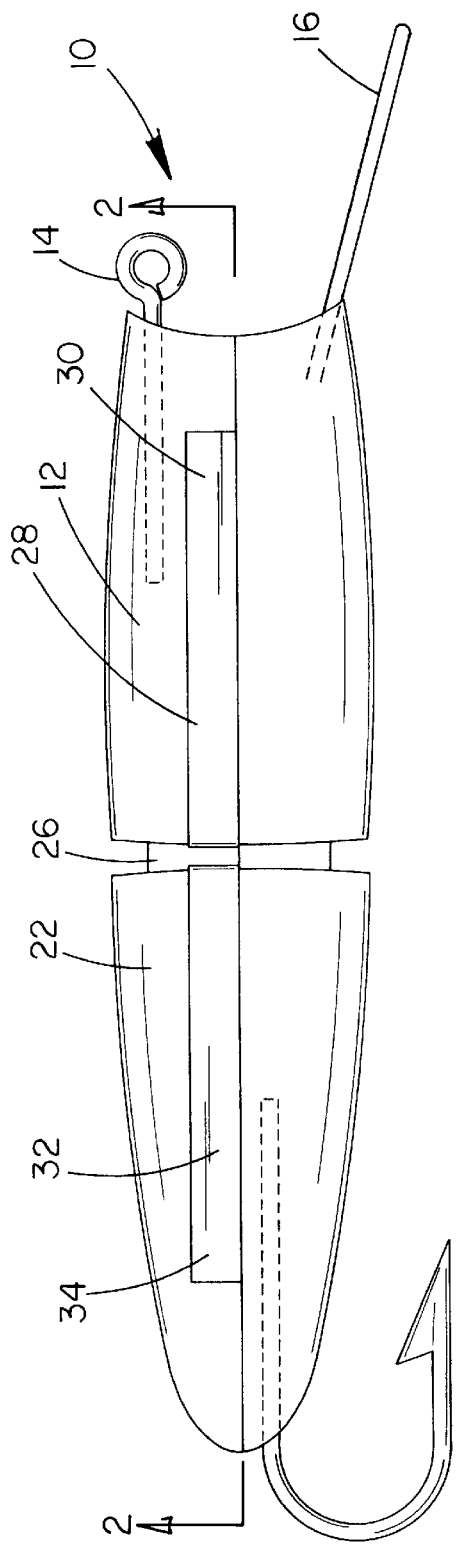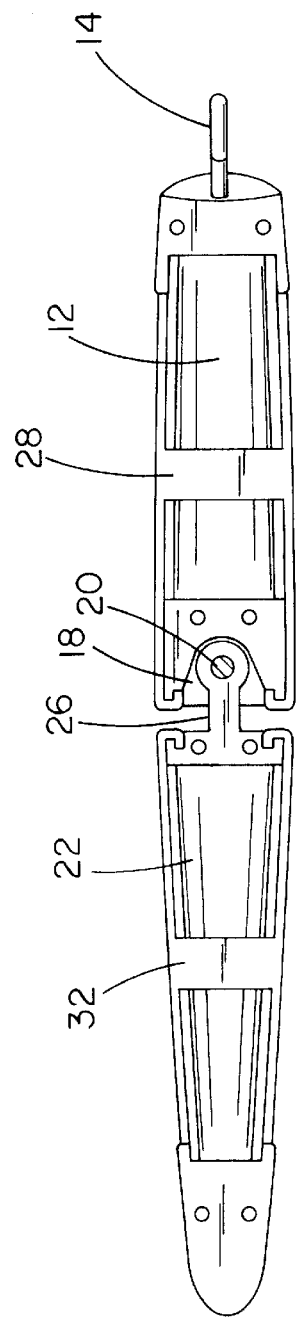
FIG. 1
FIG. 2

5,903,999

ELECTROLYSIS FISHING LURE

BACKGROUND OF THE INVENTION

1. Field of the Invention

The present invention relates to battery operated fishing lures and more particularly pertains to a new electrolysis fishing lure for attracting fish while fishing with a lure.

2. Description of the Prior Art

The use of battery operated fishing lures is known in the prior art. More specifically, battery operated fishing lures heretofore devised and utilized are known to consist basically of familiar, expected and obvious structural configurations, notwithstanding the myriad of designs encompassed by the crowded prior art which have been developed for the fulfillment of countless objectives and requirements.

Known prior art battery operated fishing lures include U.S. Pat. No. 4,888,905; U.S. Pat. No. 5,063,700; U.S. Pat. No. 4,799,327; U.S. Pat. No. 5,406,738; U.S. Pat. No. 5,117,574; and U.S. Pat. Des. No. 347,459.

In these respects, the electrolysis fishing lure according to the present invention substantially departs from the conventional concepts and designs of the prior art, and in so doing provides an apparatus primarily developed for the purpose of attracting fish while fishing with a lure.

SUMMARY OF THE INVENTION

In view of the foregoing disadvantages inherent in the known types of battery operated fishing lures now present in the prior art, the present invention provides a new electrolysis fishing lure construction wherein the same can be utilized for attracting fish while fishing with a lure.

The general purpose of the present invention, which will be described subsequently in greater detail, is to provide a new electrolysis fishing lure apparatus and method which has many of the advantages of the battery operated fishing lures mentioned heretofore and many novel features that result in a new electrolysis fishing lure which is not anticipated, rendered obvious, suggested, or even implied by any of the prior art battery operated fishing lures, either alone or in any combination thereof.

To attain this, the present invention generally comprises a first insulating body having a pair of ends and a periphery formed therebetween. As shown in FIG. 1, a first end of the first insulating body has an eyelet coupled thereto for allowing a line to be removably secured thereto. Also mounted on the first end is a shovel with a generally circular configuration. The shovel extends forwardly and downwardly from the first insulating body for reasons that will become apparent hereinafter. The second end of the first insulating body further has a recess formed therein with a vertically oriented post formed therein. Note FIG. 2. Associated therewith is a second insulating body having a pair of ends and a periphery formed therebetween. A first end of the second insulating body has a hook mounted therein and depends downwardly therefrom. A second end of the second insulating body has an arm integrally coupled thereto which extends therefrom to terminate in an eyelet. Such eyelet functions for rotatably coupling with the post of the first insulating body. This allows the first and second insulating bodies to pivot within a single horizontal plane. Next provided is a first metallic insert formed of a first metal. The first metallic insert has a pair of rectangular side faces each mounted along opposite sides of the first insulating body. Such side faces terminate at the second end of the second insulating body. A second metallic insert is formed of a second metal. Similar to the first, the second metallic insert has a pair of rectangular side faces each mounted along opposite sides of the second insulating body that terminate at the second end thereof. By this structure, upon the reciprocating of the first insulating body with respect to the second insulating body, a current is generated when the bodies are submerged in salt water.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to he understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new electrolysis fishing lure apparatus and method which has many of the advantages of the battery operated fishing lures mentioned heretofore and many novel features that result in a new electrolysis fishing lure which is not anticipated, rendered obvious, suggested, or even implied by any of the prior art battery operated fishing lures, either alone or in any combination thereof.

It is another object of the present invention to provide a new electrolysis fishing lure which may be easily and efficiently manufactured and marketed.

It is a further object of the present invention to provide a new electrolysis fishing lure which is of a durable and reliable construction.

An even further object of the present invention is to provide a new electrolysis fishing lure which is susceptible of a low cost of manufacture with regard to both materials and labor, and which accordingly is then susceptible of low prices of sale to the consuming public, thereby making such electrolysis fishing lure economically available to the buying public.

Still yet another object of the present invention is to provide a new electrolysis fishing lure which provides in the apparatuses and methods of the prior art some of the advantages thereof, while simultaneously overcoming some of the disadvantages normally associated therewith.

Still another object of the present invention is to provide a new electrolysis fishing lure for attracting fish while fishing with a lure.

Even still another object of the present invention is to provide a new electrolysis fishing lure that includes a first body having at least one portion thereof formed of a first metal. Associated therewith is a second body having at least one portion thereof formed of a second metal. The second body is movable with respect to the first body for allowing an alternating current to be generated.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new electrolysis fishing lure according to the present invention.

FIG. 2 is a cross-sectional view showing the inserts of the present invention. Such view is taken along line 2—2 depicted in FIG. 1.

DESCRIPTION OF THE PREFERRED EMBODIMENT

Figure 3:
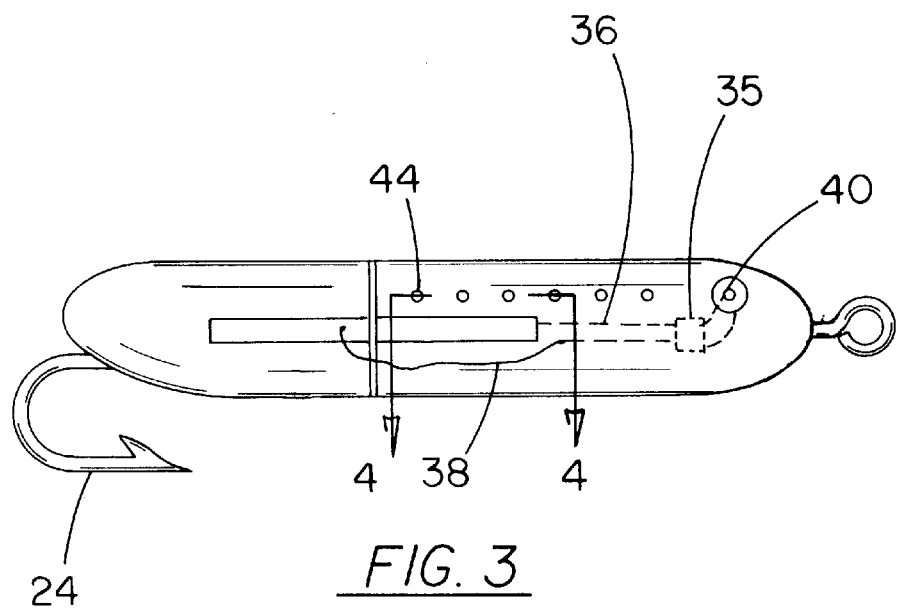
FIG. 3 is a side view of an alternate embodiment of the present invention.

With reference now to the drawings, and in particular to FIGS. 1 through 4 thereof, a new electrolysis fishing lure embodying the principles and concepts of the present invention and generally designated by the reference numeral 10 will be described.

The present invention, as designated as numeral 10, includes a first insulating body 12 having a pair of ends and a periphery formed therebetween. As shown in FIG. 1, a first arcuate end of the first insulating body has an eyelet 14 coupled thereto for allowing a line to be removably secured thereto. Also mounted on the first end is a shovel 16 with a generally circular configuration. The shovel extends forwardly and downwardly from the first insulating body for reasons that will become apparent hereinafter. The second end of the first insulating body further has a recess 18 formed therein with a vertically oriented post 20 formed therein. Note FIG. 2.

Associated therewith is a second insulating body 22 having a pair of ends and a periphery formed therebetween. A first end of the second insulating body has a J-shaped hook 24 mounted therein which depends downwardly therefrom. In the alternative, other types of hooks such as treble hooks or the like may be employed in lieu of the J-shaped hook. A second end of the second insulating body has an arm 26 integrally coupled thereto which extends therefrom to terminate in an eyelet. Such eyelet functions for rotatably coupling with the post of the first insulating body. This allows the first and second insulating bodies to freely pivot within a single horizontal plane. In the preferred embodiment, the first and second insulating bodies together define any one of a plurality of minnows such as a herring or the like.

Next provided is a first metallic insert 28 formed of a first metal. The first metallic insert has a pair of rectangular side faces 30 each mounted along opposite sides of the first insulating body. Such side faces terminate at the second end of the second insulating body. A second metallic insert 32 is formed of a second metal. Similar to the first, the second metallic insert has a pair of rectangular side faces 34 each mounted along opposite sides of the second insulating body and terminate at the second end thereof.

By this structure, upon the reciprocation of the first insulating body with respect to the second insulating body, an alternating current is generated when the bodies are submerged in salt or acidic water. This is accomplished by a voltage being generated between the spaced inserts and the intermittent shorting of such inserts during the pivoting of the insulating bodies. Such shorting of the inserts attracts fish to the lure. It has been observed that different fish respond to different levels of voltage. Further, it has been observed that the hydrogen by-product of the electrolysis also attracts fish to the lure.

It should be understood that the first metal and second metal may consist of any combination of metals that produce a desired voltage therebetween when submerged in water. For example, the first metal may comprise of copper and the second metal may comprise of aluminum.

As an option, a voltage converter 35 is mounted within the first insulating body, as shown in FIG. 3. The voltage converter has a first wire 36 connected to the first metallic insert and a second wire 38 connected to the second metallic insert. Such interconnection allows for the production of a direct current at an output of the converter upon the receipt of the alternating current. It should be noted that in the present embodiment, the second wire is insulated and extends partially along the exterior of the bodies with enough slack and flexibility to allow the free reciprocation of the bodies. In the alternative, a cam and spring combination or brush contacts may be employed to accomplish the same.

Mounted on opposite sides of the first insulating body is a pair of light emitting diodes 40, or any other low power light means. Such diodes are connected to the output of the voltage converter for illuminating upon the receipt of the direct current. For reasons that will soon become apparent, the light emitting diodes are only partially exposed to an exterior of the first insulating body.

Figure 4:
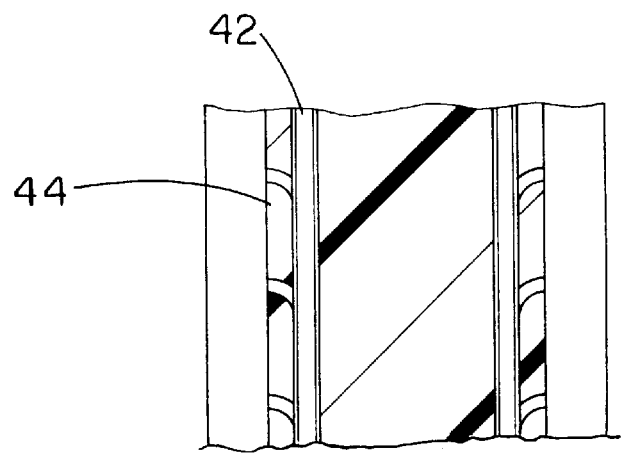
FIG. 4 is a cross-sectional view of the present invention taken along line 4—4 of FIG. 3.

As a final option, a pair of fiber optic cables 42 are each mounted within the first insulating body adjacent to opposite sides thereof. Each fiber optic cable has an end situated adjacent a corresponding one of the light emitting diodes for receiving light therefrom upon the illumination thereof. As shown in FIG. 4, each fiber optic cable further includes a plurality of linearly aligned strands 44 extending between the fiber optic cable and an exterior of the associated side of the first insulating body. This allows the visible emission of light from the first insulating body thereby working in conjunction with the alternating current to attract fish.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electric fishing lure comprising, in combination:

a first insulating body having a pair of ends and a periphery formed therebetween, a first end of the first insulating body having an eyelet coupled thereto for allowing a line to be removably secured thereto and a shovel with a generally circular configuration coupled thereto and extending forwardly and downwardly therefrom, the second end of the first insulating body having a recess formed therein with a vertically oriented post formed therein;

a second insulating body having a pair of ends and a periphery formed therebetween, a first end of the second insulating body having a hook mounted therein and depending downwardly therefrom, a second end of the second insulating body having an arm integrally coupled thereto and extending therefrom to terminate in an eyelet for rotatably coupling with the post of the first insulating body thereby allowing the first and second insulating bodies to pivot within a single common plane;

a first metallic insert formed of a first metal and having a pair of rectangular side faces each mounted along opposite sides of the first insulating body and terminating at the second end thereof;

a second metallic insert formed of a second metal and having a pair of rectangular side faces each mounted along opposite sides of the second insulating body and terminating at the second end thereof, whereby upon the reciprocating of the first insulating body with respect to the second insulating body, an alternating current is generated when the bodies are submerged in salt water;

a voltage converter mounted within the first insulating body and having a first wire connected to the first metallic insert and a second wire connected to the second metallic insert for producing a direct current at an output thereof upon the receipt of the alternating current;

a pair of light emitting diodes mounted on opposite sides of the first insulating body adjacent to the first end thereof and connected to the output of the voltage converter for illuminating upon the receipt of the direct current, wherein the light emitting diodes are only partially exposed to an exterior of the first insulating body; and a pair of fiber optic cables each mounted within the first insulating body and mounted adjacent to opposite sides thereof, each fiber optic cable having an end situated adjacent a corresponding one of the light emitting diodes for receiving light therefrom upon the illumination thereof, each fiber optic cable further including a plurality of strands extending between the fiber optic cable and an exterior of the associated side of the first insulating body, thereby allowing the visible emission of light therefrom.

2. An electric fishing lure comprising:

a first body having at least one portion thereof formed of a first metal;

a second body having at least one portion thereof formed of a second metal, the second body movable with respect to the first body;

a hook mounted to at least one of the first body and second body; and a line attachment means mounted to at least one of the first body and second body;

whereby upon the movement of the bodes with respect to each other, a current is generated.

3. An electric fishing lure as set forth in claim 2 wherein the bodies are at least partially insulative.

4. An electric fishing lure as set forth in claim 2 wherein the bodies are pivotally coupled with respect to each other.

5. An electric fishing lure as set forth in claim 2 wherein a shovel means is mounted on at least one of the bodies for facilitating the moving of the bodies with respect to each other.

6. An electric fishing lure as set forth in claim 2 wherein the bodies are adapted to pivot within a single common plane.

7. An electric fishing lure as set forth in claim 2 wherein the metals of each body take the form of inserts with faces exposed on an exterior of the body.

8. An electric fishing lure as set forth in claim 2 and further including a light means connected to the metals and adapted to illuminate upon the generation of the current.

9. An electric fishing lure as set forth in claim 8 and further including a voltage converter connected between the light means and metals for supplying the light means with direct current upon the generation of the current.

10. An electric fishing lure as set forth in claim 8 and further including a fiber optic cable in communication with the light means for redirecting the light thereby generated.

11. An electric fishing lure comprising:

a first body having at least one portion thereof formed of a first metal;

a second body having at least one portion thereof formed of a second metal;

a hook mounted to at least one of the first body and second body; and a line attachment means mounted to at least one of the first body and second body;

a light means connected to the metals and adapted to illuminate upon the generation of current.

whereby upon the submergence of the bodies within water, current is generated.

* * * * *